United States Defensive Publication [19] (H) [11] T985,003

Bertozzi et al. [43] Aug. 7, 1979

[54] SYNERGISTIC LIGHT STABILIZER BLENDS FOR POLY(VINYL CHLORIDE) POLYMERS

[75] Inventors: Eugene R. Bertozzi, Yardley; Henry N. Paul, 3rd, Philadelphia, both of Pa.

[73] Assignee: Thiokol Corporation, Newtown, Pa.

[21] Appl. No.: 944,120

[22] Filed: Sep. 20, 1978

Related U.S. Application Data

[63] Continuation-in-part of Ser. No. 863,753, Dec. 23, 1977.

[51] Int. Cl.[2] ..... C08K 5/57

[52] U.S. Cl. ..... 260/45.75 S; 260/429.7; 252/406; 424/288

[57] ABSTRACT

Tin salts formed by the reaction of di lower alkyl or aryl tin oxides and dimercapto ethyl formal and similar dimercapto compounds of the general formula

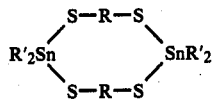

wherein R is $-(CH_2)_m(OCH_2)_s-O\text{-}(CH_2)_m-(OCH_2)_p-O\text{-}_n(CH_2)_m-$ wherein p is 0 or 1, m is 2 to about 6 and n is 0 to about 6 and R′ is lower alkyl of up to about 10 carbon atoms, or carbocyclic aryl containing one or two aromatic rings when combined with conventional tin based stabilizers show a synergistic light and heat stabilizing effect in poly(vinyl chloride) polymers.

6 Claims, No Sheets Drawing,

22 Pages Specification

The file of this unexamined application may be inspected and copies thereof may be purchased (849 O.G. 1221, Apr. 9, 1968).